United States Patent [19]

Öhman

[11] Patent Number: 5,642,629
[45] Date of Patent: Jul. 1, 1997

[54] COOLED AIR CYCLE SYSTEM AND METHOD FOR OPERATING SUCH A SYSTEM

[75] Inventor: Henrik Öhman, Täby, Sweden

[73] Assignee: Svenska Rotor Maskiner AB, Stockholm, Sweden

[21] Appl. No.: 540,705

[22] Filed: Oct. 11, 1995

[30] Foreign Application Priority Data

Feb. 20, 1995 [SE] Sweden .................... 9500609

[51] Int. Cl.$^6$ .................... F25D 9/00
[52] U.S. Cl. .................... 62/401; 62/86
[58] Field of Search .................... 62/86, 87, 401, 62/402, 272, 271

[56] References Cited

U.S. PATENT DOCUMENTS

| | | | |
|---|---|---|---|
| 3,045,447 | 7/1962 | Wagenius | 62/87 |
| 3,213,640 | 10/1965 | Dubinsky et al. | 62/402 |
| 3,686,893 | 8/1972 | Edwards | 62/402 |
| 3,965,697 | 6/1976 | Beierwaltes | 62/402 |
| 4,198,830 | 4/1980 | Campbell | 62/87 |
| 4,738,120 | 4/1988 | Lin | 62/272 |
| 5,168,728 | 12/1992 | Djelouah et al. | 62/87 |
| 5,323,624 | 6/1994 | Schwalm | 62/401 |
| 5,438,845 | 8/1995 | Kirschner et al. | 62/172 |
| B1 4,198,830 | 4/1995 | Campbell | 62/87 |

FOREIGN PATENT DOCUMENTS

| | | |
|---|---|---|
| 2311813 | 9/1973 | Germany . |
| 4218299 | 12/1993 | Germany . |
| 2112661 | 7/1983 | United Kingdom . |

*Primary Examiner*—William Doerrler
*Attorney, Agent, or Firm*—Frishauf, Holtz, Goodman, Langer & Chick

[57] ABSTRACT

A cooled air cycle system having a compressor (1) for compressing air, heat exchangers (3,4,5) for cooling the compressed air, a water separator (6) for withdrawing water from the compressed air, and an expander (2) for expanding the air back to substantially compressor inlet pressure, which air is cooled and can be used, for example, for air-conditioning. A regenerative dryer (7) is provided in conduits between the compressor (1) and the expander (2). The dryer (7) includes a water adsorbing section (18), which alternatingly is brought into contact with the compressed air at at least two locations (A,B,C). In one location (B), which is after the first heat exchanger (3) and the water separator (6), water is adsorbed from the air by the adsorbing section (18), and in another location (A), which is before the first heat exchanger (3) and the water separator (6), the adsorbing section (18) is regenerated in that the adsorbed water is brought away by the air. The cooling effect required for cooling the air between compression and expansion therethrough is considerably decreased.

9 Claims, 1 Drawing Sheet

COOLED AIR CYCLE SYSTEM AND METHOD FOR OPERATING SUCH A SYSTEM

BACKGROUND OF THE INVENTION

The present invention relates to a cooled air cycle system and to a method for operation such a system.

Refrigeration systems usually employ a two-phase cycle with a refrigerant that alternates between gaseous and liquid states. Such systems have a large cooling capacity due to the amount of heat that can be taken up when the refrigerant evaporates and are therefore superior to any alternative in most applications, normally also for air-conditioning. However, the equipment in such a system is circumstantial and expensive and requires a closed piping circuit to isolate the usually pollutional refrigerant from the environment. And since refrigeration systems at the end transfer the cold through air or another gas, these conventional systems incorporate both a primary cooling medium, i.e. the refrigerant in the closed circuit and a secondary cooling medium, i.e. the air that transfers the cold to the object to be cooled.

It has been known that refrigeration also can be attained by a cooled air cycle system, also called open reversed Brayton cycle. In such a system the air itself is the working medium in the refrigeration cycle. There is thus no need for a special refrigerant that is cyclically condensed and evaporated and there is no need to transfer the cold from a refrigerant to the air, since they are one and the same. Such systems therefore also eliminate the risk for pollution. In a cooling system according to this principle the gas, normally air is first compressed, whereby the pressure and the temperature rise. The warm compressed gas is then cooled in a heat exchanger and thereafter expanded with substantially the same pressure ratio as that of the compressor. The air leaving the expander will be cooler than the air entering the compressor and can perform its cooling purpose, e.g. air-conditioning, which normally takes place at atmospheric pressure, i.e. the same pressure as the compressor inlet pressure if located at ground level.

Examples of system operating according to the cooled air cycle are disclosed in U.S. Pat. No. 3,045,447, U.S. Pat. No. 3,686,893, U.S. Pat. No. 3,965,697 and German DE 42 18 299.

Cooled air cycle systems have small cooling capacity in comparison with conventional cooling systems, which is the main reason why they rarely have come into use. For some applications, however, where conventional cooling systems due to environmental and other reasons are not, a cooled air cycle system might be an advantageous alternative. The low efficiency of such a system, however, calls for improvements in this respect in order to make the cooled air cycle system more competitive, both for cooling applications e.g. air conditioning and for heat pump applications.

The object of the present invention thus is to improve the efficiency of a cooled air cycle system.

SUMMARY OF THE INVENTION

According to the present invention, a cold air cycle system comprises an air compressor (1) which compresses air; an expander (2) arranged to expand air compressed by the compressor; a conduit (9–15) arranged relative to the compressor (1) and expander (2) to conduct the compressed air from the compressor (1) to the expander (2); a heat exchanger arranged in heat exchanging relation with the conduit (9–15) for withdrawing heat from the compressed air, the heat exchanger including a first heat exchanger unit (3) and a second heat exchanger unit (4); and a water separator device (6) arranged in communication with the conduit to withdraw water from the compressed air. The conduit includes a cyclically movably regenerative drying device (7), the drying device (7) including a water adsorbing section (18) and a driving device (17), the driving device (17) being arranged and operated to cyclically establish contact between the compressed air and at least a part of the water adsorbing section (18) at at least first and second locations (A,B) of the conduit (9–15), the first location (A) being upstream of the first heat exchanger unit (3) and the water separator device (6), and the second location (B) being downstream of the first heat exchanger unit (3) and the water separator device (6). The second heat exchanger unit (4) of the heat exchanger is located downstream of the second location (B). The driving device (17) also establishes contact between the compressed air and the at least a part of the adsorbing section (18) at a third location (C), the third location (C) being downstream of the second heat exchanger unit (4) but upstream of the expander (2). The air compressed by the compressor (1) is at a raised temperature due to compression supplied to the first location (A) for adsorbing water adsorbed in the second and third locations (B,C).

According to another aspect of the present invention, a method for operating a cold air cycle system comprises compressing air in a compressor (1); expanding air compressed by the compressor, in an expander (2); conducting the compressed air from the compressor (1) to the expander (2), via a conduit (9–15); providing a heat exchanger arranged in heat exchanging relation with the conduit (9–15) for withdrawing heat from the compressed air, the heat exchanger including a first heat exchanger unit (3) and a second heat exchanger unit (4); providing a water separator device (6) arranged in communication with the conduit for withdrawing water from the compressed air; and regeneratively drying the compressed air by alternatingly bringing at least a part of a water adsorbing section (18) into contact with the compressed air at at least first and second locations (A,B), the first location (A) being at a position before the compressed air has reached the first heat exchanger unit (3) and the water separator device (6), and the second location (B) being after the compressed air has left the first heat exchanger unit (3) and the water separator device (6). After the passage of the compressed air through the first heat exchanger unit (3) and the water separator device (6), the compressed air is fed through the second heat exchanger unit (4) which is located downstream of the second location (B). The compressed air is brought into contact with the water adsorbing section (18) at a third location (C) positioned downstream of the second heat exchanger unit (4) but upstream of the expander (2). The air compressed by the compressor (1) is at a raised temperature due to compression supplied to the first location (A) for adsorbing water in the second and third locations (B,C).

In a system of this kind used for air-conditioning, a large part of the cooling effect for cooling the compressed air before reaching the expander is consumed for the condensation of the water vapour contained in the incoming air from ambient. In a typical example when the incoming air has a temperature of 40° C. and a humidity of 70% and the cooling air leaving the expander has a temperature of 3° C. and being saturated, the energy for cooling the compressed air will be about 35 kJ/kg air and the energy for condensing the water vapour in the air will amount to about 80 kJ/kg air. Most of the cooling effect thus is consumed for condensing the water in the air.

By providing the regenerative dryer in the conduits between the compressor and the expander, a large amount of the effect used for the condensation is saved, and the efficiency of the system will be considerably increased. This kind of dryer is well-known for drying atmospheric or compressed air and forms per se no part of the invention.

In a preferred embodiment of the invention both the compression and expansion take place in rotary screw machines, whereby a particularly efficient system is attained due to the high volumetric capacity of such machines.

It is advantageous to arrange the dryer so that water is adsorbed in two steps and to provide heat exchangers for cooling the air before and after each step, and a suitable dryer is of the rotating type.

BRIEF DESCRIPTION OF THE DRAWINGS

The invention will be further explained through the following detailed description of a preferred embodiment thereof and with reference to the accompanying drawings, of which

DETAILED DESCRIPTION OF THE PREFERRED EMBODIMENT

Figure 1:
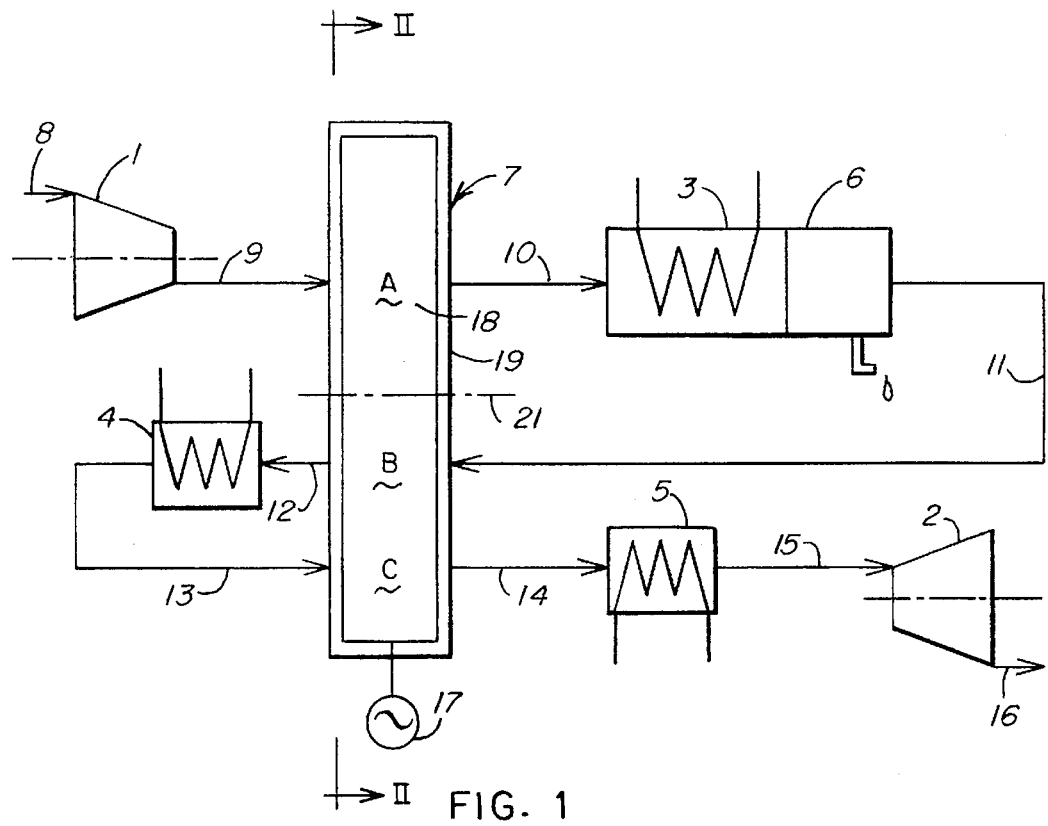
FIG. 1 is a functional block diagram representation of a system according to the invention and FIG. 2 is a schematic section along line II—II of FIG. 1.

FIG. 1, schematically illustrates the invented system in an application producing cold dry air for air-conditioning. A rotary screw compressor 1 receives atmospheric air through an inlet conduit 8 and delivers the compressed air to an outlet conduit 9 at a raised pressure, typically about 3 bars and at a raised temperature due to the compression. The air then flows through conduits 9 to 15 to a rotary screw expander 2 in which the air is expanded to a pressure slightly above the compressor inlet pressure and leaves the expander 2 to a delivery conduit 16.

Between the compressor 1 and the expander 2, as means is provided for cooling the air and for withdrawing water therefrom, so that the air reaching the expander 2 will have slightly higher temperature than the compressor inlet air. After the expansion the temperature of the air will be considerably lower and can be used for cooling purposes. The cooling and water separating means comprises of a first 3, a second 4 and a third 5 heat exchanger which cool the air, a water separator 6 connected to the first heat exchanger 3 and a regenerative dryer 7.

The hot air from the compressor 1 flows through conduit 9, a regenerating section A of the dryer 7 and conduit 10 to a first heat exchanger 3, in which the air is cooled.

A water separator 6 is connected to the first heat exchanger 3 for withdrawal of water contained in the air, which water has been condensed through the cooling in the heat exchanger 3. Thereafter the air flows through conduit 11 to a second section B of the dryer 7, in which the water adsorbing structure thereof adsorbs water vapour from the air, thereby decreasing its humidity. The air leaving the second section B of the dryer 7 then passes a second heat exchanger 4 further lowering the air temperature and is then conducted through conduit 13 to a third section C of the dryer 7, where further vapour can be adsorbed due to the cooling in heat exchanger 4. After leaving section C of the dryer 7 the air flows via a third heat exchanger 5 for further cooling to the expander 2. Due to the drying of the air in sections B and C of the dryer the humidity of the air reaching the expander is very low, representing a dew temperature of about −20° C. The temperature fall of the air during the expansion therefore will not condense any water, and the air can be delivered for cooling without risk of condensation on the delivery side.

The regenerative dryer 7 is of the rotating type, driven by an electric motor 17 around axis 21 at a speed of 5 to 10 rpm. A generally cylindrical rotor structure 18 capable of adsorbing water rotates by the motor 17 in a housing 19 sealingly co-operating with the rotor 18, which housing 19 is provided with openings connected to the air conduits. Dryers of this type are available on the market. The rotor structure of such a dryer typically is built up by glass fibre reinforced paper in a honeycomb pattern, which is impregnated with silicagel as the active substance.

Figure 2:
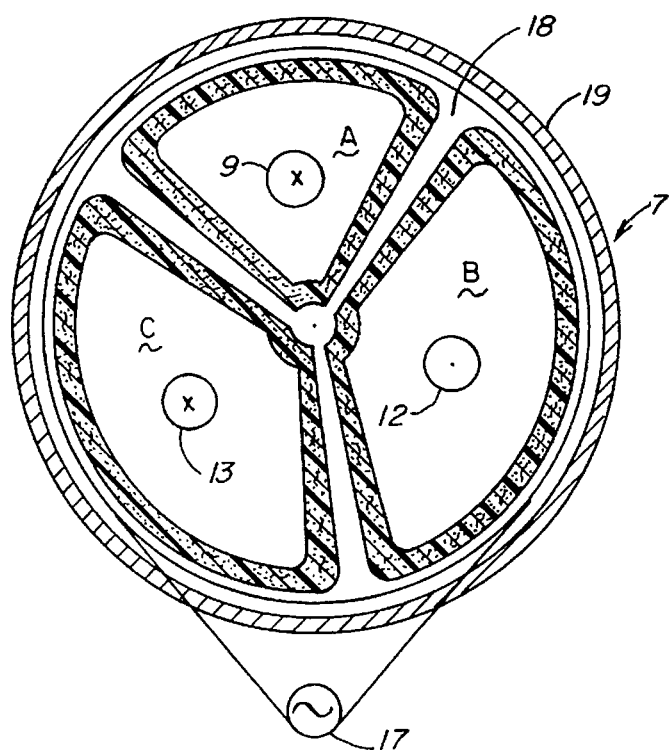

FIG. 2 schematically illustrates the dryer 7 as seen along line II—II of FIG. 1. Each of the three sectorshaped sections A, B, C is delimited by a seal element (not shown) attached to the housing and contacting an end of the rotor structure along a loop, these loops being represented by the shaded areas in the figure. In the three sections the connections to the conduits 9, 12 and 13 are indicated by end views of arrow symbols illustrating in- and outflow, respectively. It is to be noted that the connections of conduits 9, 12, 13 to the sections A B, C lie above the plane of the drawing and end in correspondingly shaped spaces which face the rotor structure, so that the air is admitted to the entire of each section.

As the rotor structure 18 rotates, each part thereof passes the three sections A, B, C, delimited by the seal elements on each end of the rotor 18, and each section communicates with an inlet at one side and an outlet on the opposite side. In section B the rotor structure 18 adsorbs vapour from the air passing from conduit 11 to conduit 12 and in section C vapour from the air passing from conduit 13 to conduit 14, which vapour condensates as it adsorbs in the structure. When the structure carrying the condensed water reaches section A it comes into contact with the hot compressed air from the compressor, which has low humidity so that the adsorbed water will evaporate and flow with the air through conduit 10 to the cooling heat exchanger 3. The major part of this water vapour and that of the incoming air condenses due to the cooling and is withdrawn in the water separator 6. The structure thereby is regenerated when passing section A and will thus be capable to adsorb water when reaching sections B and C the next time.

By the use of the regenerative heat exchanger in the cooled air cycle system the cooling effect required for cooling the compressed air before the expansion has been reduced to less than a third at the cost of the almost negligible power for driving the dryer.

I claim:
1. A cold air cycle system comprising:
   an air compressor (1) which compresses air;
   an expander (2) arranged to expand air compressed by said compressor;
   a conduit (9–15) arranged relative to said compressor (1) and expander (2) to conduct said compressed air from said compressor (1) to said expander (2);
   a heat exchanger arranged in heat exchanging relation with said conduit (9–15) for withdrawing heat from said compressed air, said heat exchanger including a first heat exchanger unit (3) and a second heat exchanger unit (4); and
   a water separator device (6) arranged in communication with said conduit to withdraw water from said compressed air;

and wherein:

said conduit includes a cyclically movably regenerative drying device (7), said drying device (7) including a water adsorbing section (18) and a driving device (17), said driving device (17) being arranged and operated to cyclically establish contact between said compressed air and at least a part of said water adsorbing section (18) at at least first and second locations (A,B) of said conduit (9–15), said first location (A) being upstream of said first heat exchanger unit (3) and said water separator device (6), and said second location (B) being downstream of said first heat exchanger unit (3) and said water separator device (6);

said second heat exchanger unit (4) of said heat exchanger is downstream of said second location (B);

said driving device (17) also establishes contact between said compressed air and said at least a part of said adsorbing section (18) at a third location (C), said third location (C) being downstream of said second heat exchanger unit (4) but upstream of said expander (2); and said air compressed by said compressor (1) is at a raised temperature due to compression supplied to said first location (A) for adsorbing water adsorbed in said second and third locations (B,C).

2. A system according to claim 1, wherein at least one of said compressor (1) and said expander (2) includes a rotary screw machine.

3. A system according to claim 1, wherein:

said drying device (7) is of a rotating type;

said driving device (17) comprises a rotary drive device; and said water adsorbing section (18) is in the form of a substantially cylindrical rotatable structure through which the compressed air passes, said substantially cylindrical structure rotating in a casing (19), said casing forming three separated sectorial sections with one section in each of said first, second and third locations (A,B,C).

4. A system according to claim 2, wherein:

said drying device (7) is of a rotating type;

said driving device (17) comprises a rotary drive device; and said water adsorbing section (18) is in the form of a substantially cylindrical rotatable structure through which the compressed air passes, said substantially cylindrical structure rotating in a casing (19), said casing forming three separated sectorial sections with one section in each of said first, second and third locations (A,B,C).

5. A system according to claim 1, wherein said heat exchanger includes a third heat exchanger unit (5) located downstream of said third location (C) and upstream of said expander (2).

6. A system according to claim 2, wherein said heat exchanger includes a third heat exchanger unit (5) located downstream of said third location (C) and upstream of said expander (2).

7. A method for operating a cold air cycle system comprising:

compressing air in a compressor (1);

expanding air compressed by said compressor, in an expander (2);

conducting said compressed air from said compressor (1) to said expander (2), via a conduit (9–15);

providing a heat exchanger arranged in heat exchanging relation with said conduit (9–15) for withdrawing heat from said compressed air, said heat exchanger including a first heat exchanger unit (3) and a second heat exchanger unit (4);

providing a water separator device (6) arranged in communication with said conduit for withdrawing water from said compressed air;

regeneratively drying said compressed air by alternatingly bringing at least a part of a water adsorbing section (18) into contact with said compressed air at at least first and second locations (A,B), said first location (A) being at a position before said compressed air has reached said first heat exchanger unit (3) and said water separator device (6), and said second location (B) being after said compressed air has left said first heat exchanger unit (3) and said water separator device (6);

after the passage of said compressed air through said first heat exchanger unit (3) and said water separator device (6), feeding said compressed air through said second heat exchanger unit (4) which is located downstream of said second location (B); and bringing said compressed air into contact with said water adsorbing section (18) at a third location (C) positioned downstream of said second heat exchanger unit (4) but upstream of said expander (2), and wherein said air compressed by said compressor (1) is at a raised temperature due to compression supplied to said first location (A) for adsorbing water in said second and third locations (B,C).

8. The method according to claim 7, comprising providing at least one of said compressor (1) and said expander (2) as a rotary screw machine.

9. The method according to claim 7, providing a third heat exchanger unit (5) located downstream of said third location (C) and upstream of said expander (2).

* * * * *